(12) United States Patent
Meis et al.

(10) Patent No.: US 6,256,580 B1
(45) Date of Patent: Jul. 3, 2001

(54) PROCESS FOR TRANSMITTING ROUTE INFORMATION WHICH DEFINES A PROPOSED ROUTE FOR A VEHICLE IN A ROAD NETWORK AND SERVES AS A NAVIGATION AID FROM A TRAFFIC INFORMATION CENTER TO A TERMINAL IN A VEHICLE, TRAFFIC INFORMATION CENTER AND TERMINAL

(75) Inventors: Josef Meis, Münster; Andreas Parra, Hamburg; Peter Stangier, Wesseling, all of (DE)

(73) Assignee: Mannesmann AG, Düsseldorf (DE)

(*) Notice: Subject to any disclaimer, the term of this patent is extended or adjusted under 35 U.S.C. 154(b) by 0 days.

(21) Appl. No.: 09/331,096
(22) PCT Filed: Nov. 27, 1997
(86) PCT No.: PCT/DE97/02814
  § 371 Date: Jun. 16, 1999
  § 102(e) Date: Jun. 16, 1999
(87) PCT Pub. No.: WO98/27526
  PCT Pub. Date: Jun. 25, 1998

(30) Foreign Application Priority Data

Dec. 16, 1996 (DE) .............................. 196 53 694
Nov. 10, 1997 (DE) .............................. 197 50 778

(51) Int. Cl.$^7$ .................................................. G01C 21/00
(52) U.S. Cl. ........................... 701/202; 701/200; 701/201

(58) Field of Search .................................. 701/200, 201, 701/202, 207–216, 23–28

(56) References Cited

U.S. PATENT DOCUMENTS

| 5,508,917 | * | 4/1996 | Siegle et al. ...................... 701/207 |
| 5,678,194 | * | 10/1997 | Grube et al. ...................... 701/207 |
| 5,699,255 | * | 12/1997 | Ellis et al. ........................ 701/212 |
| 5,839,086 | * | 11/1998 | Hirano ............................. 701/201 |
| 5,867,110 | * | 2/1999 | Naito et al. ..................... 701/201 X |
| 5,875,412 | * | 2/1999 | Sulich et al. ...................... 701/207 |
| 6,009,403 | * | 12/1999 | Sato ............................. 701/201 X |
| 6,044,312 | * | 3/2000 | Sudo et al. ......................... 701/25 |

* cited by examiner

Primary Examiner—Bernarr E. Gregory
(74) Attorney, Agent, or Firm—Cohen, Pontani, Lieberman & Pavane

(57) ABSTRACT

Comfortable navigation is made possible with a small amount of transmitted information by a terminal unit, a central station and a process for the transmission of route information completely defining a route of a vehicle in a traffic network, which route is suggested as a navigation aid, from a central traffic station to a terminal unit in the vehicle. The route information concerns path points located on the suggested route, wherein a path point is defined wherever it is recommended by the central traffic station that the vehicle turn off from a road. Additional information defining the next path point following in the driving direction of the suggested route is transmitted in addition to route information at a path point.

7 Claims, 2 Drawing Sheets

PROCESS FOR TRANSMITTING ROUTE INFORMATION WHICH DEFINES A PROPOSED ROUTE FOR A VEHICLE IN A ROAD NETWORK AND SERVES AS A NAVIGATION AID FROM A TRAFFIC INFORMATION CENTER TO A TERMINAL IN A VEHICLE, TRAFFIC INFORMATION CENTER AND TERMINAL

BACKGROUND OF THE INVENTION

1. Field of the Invention

The invention is directed to a process for the transmission of route information defining a route of a vehicle in a traffic network, which route is suggested as a navigation aid, from a central traffic station to a terminal unit in a vehicle, a central bureau and a terminal unit.

2. Discussion of the Prior Art

The transmission of route information defining a route of a vehicle in a traffic network, which route is suggested as a navigation aid, from a central traffic station to a terminal unit in a vehicle is usually carried out via mobile radio, resulting in rising telecommunications costs as the extent of transmitted route information increases. However, it is required for end user comfort and for a reliable, clear definition of a route that complex intersections in particular are described as ergonomically and as completely as possible. When there is a complete digital map of the traffic network in a terminal unit of a vehicle, a complex intersection located ahead of the terminal unit user in the driving direction can also be displayed completely and therefore with a high degree of end user convenience and low error probability. However, the problem in this respect is that the digital map in the terminal unit diverges from the digital map in the central station after a period of time due to construction sites, large events, new roads, changes in driving direction on roads, etc.

SUMMARY OF THE INVENTION

It is the object of the present invention to enable comfortable navigation with the least possible transmission of information.

The invention enables a comfortable navigation. The extent of route information for navigation aid which is to be transmitted for this purpose from a central traffic station to a terminal unit is small. Information about the section between two path points is transmitted with route information concerning a path point. The route serving as navigation aid which is suggested through route information, for example, upon request by the terminal unit to a central station accompanied by indication of the terminal unit location and the desired target location, is transmitted through path points on the suggested route, wherein path points are defined wherever it is recommended that the vehicle turn off from a road on which it is located. Accordingly, there is no need for continuous information for the vehicle about the driving direction the vehicle must take at turns, etc., between two path points.

The additional information which defines the next path point following in the driving direction of the suggested route can be indicated in different ways. In particular, the added information can define the length of the section of road to be driven between two path points. The user of a terminal unit who is informed about the section length can accordingly prepare for the time of the next turnoff. The additional information about the next path point following a path point can also contain information on turn possibilities between the two path points; for this purpose, the indications of turn possibilities can include the number of left-turn possibilities and/or the number of right-turn possibilities. When turn possibilities of this kind are displayed (acoustically and/or optically) in the terminal unit, the user can be provided with information capable of easy evaluation.

The direction in which the vehicle must turn on the suggested route is advisably included in the transmission at a path point, whereupon it can be displayed by the terminal unit for the user. The direction can be transmitted as left; right; straight; sharp left, etc. or as a compass direction such as north; west; east; south; southwest, etc. or in both ways, so that clear turn information can be generated for the user of the terminal unit.

Particularly when there is no digital map of the traffic network in the terminal unit, it is advisable when the name of the road to be turned onto is transmitted in order to inform the user of the terminal unit about this.

The transmission from the central traffic station to the terminal unit is advisably carried out in a wireless manner, especially via mobile radio.

The process can be implemented in a central station and in a terminal unit as a program.

Further features and advantages of the invention are indicated in the following description of an embodiment with reference to the drawings.

DETAILED DESCRIPTION OF THE PREFERRED EMBODIMENTS

Figure 1:
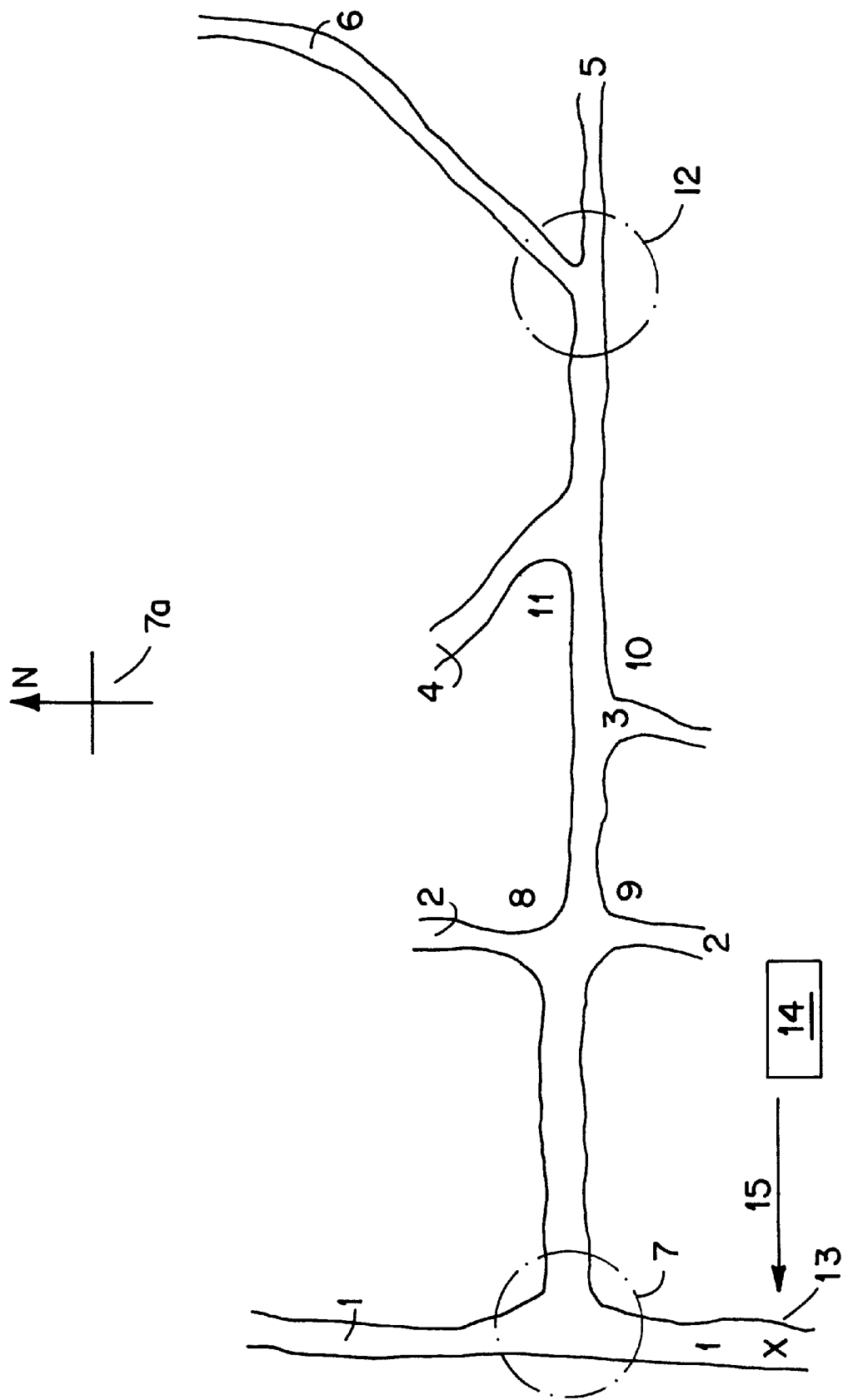
FIG. 1 shows a section of a traffic network.

The traffic network shown as a section in FIG. 1 has the following roads: 1=Kölner Strasse; 2=Verdi-Strasse; 3=Mozart-Strasse; 4=Hinterer Waldweg; 5=Beethoven-Strasse; 6=Bachstrasse. Also shown is a compass 7a which indicates that the compass direction in FIG. 1, at top, is north in the traffic network (1 to 6). Coming from the south on Kölner Strasse 1, the turn possibility 7 is to the right onto Beethoven-Strasse 5. Driving along Beethoven-Strasse 5, proceeding east from turn possibility 7 off of Kölner Strasse, that is, to the right in FIG. 1, the possible turns on the left are 8 into Verdi-Strasse 2, 11 into Hinterer Waldweg 4, and 12 into Bachstrasse 6; the possible turns on the right are 9 into Verdi-Strasse 2 and 10 into Mozart-Strasse 3.

The vehicle 13 with a terminal unit, not shown, moves north on Kölner Strasse 1, that is, from the bottom in FIG. 1, to turn possibility 7. The driver of the vehicle 13 requests a navigation aid from the central traffic station 14 for a route which the driver indicates by his current position and by the desired destination. The central traffic station 14 calculates a suggestion for an optimum route of the vehicle 13 to its desired destination with a route calculation program based on a digital map of the traffic network 1 to 6, the indicated starting location and destination, and on the basis of further information (such as the distribution of average speeds, vehicle volumes, traffic backups which are determined by stationary or mobile detectors in the traffic network, based on accident reports, historic database in the central station 14, etc.). For this purpose, route information is transmitted from the central traffic station 14 to the terminal unit in the vehicle 13 by mobile radio 15. The route information defines the route worked out in the central traffic station 14 based on path points lying on this route, wherein a path point of this kind is defined wherever the central traffic station 14 recommends that the vehicle turn off at turn possibilities 7, 12 from a road 1, 5 into another road 5, 6. Accordingly, a first path point 7 is defined at the turn possibility at which the vehicle 13 is to turn off on the suggested route from Kölner Strasse 1 onto Beethoven-Strasse 5. A second path point 12 is defined at the turn possibility at which the vehicle 13 should turn to follow the suggested route from Beethoven-Strasse 5 onto Bachstrasse 6. In order to provide complete information to the driver of the vehicle 13 with the terminal unit, it is necessary to inform the driver how to respond at turn possibilities 8, 9, 10, 11.

For this purpose, additional information defining the next path point 12 following in the driving direction of the suggested route 1, 5, 6 is transmitted to the driver at path point 7. This additional information can contain, for example, the information that the distance from path point 7 to the next path point (12) is 23 km. Therefore, after path point 7 (on Beethovenstrasse 5), the driver must follow the same road 5 for 23 km without turning off. Further, in addition to the information about where to turn, it is possible with regard to path point 7 to transmit the information that the next path point 12 is the third possibility for a left-turn (that is, after left-turn possibilities 8, 11) or the second possibility to turn left after two possibilities 9 for turning right. Accordingly, the additional information can also be given by turn possibilities located between two path points, especially by the number of left-turn and/or right-turn possibilities.

Figure 2:
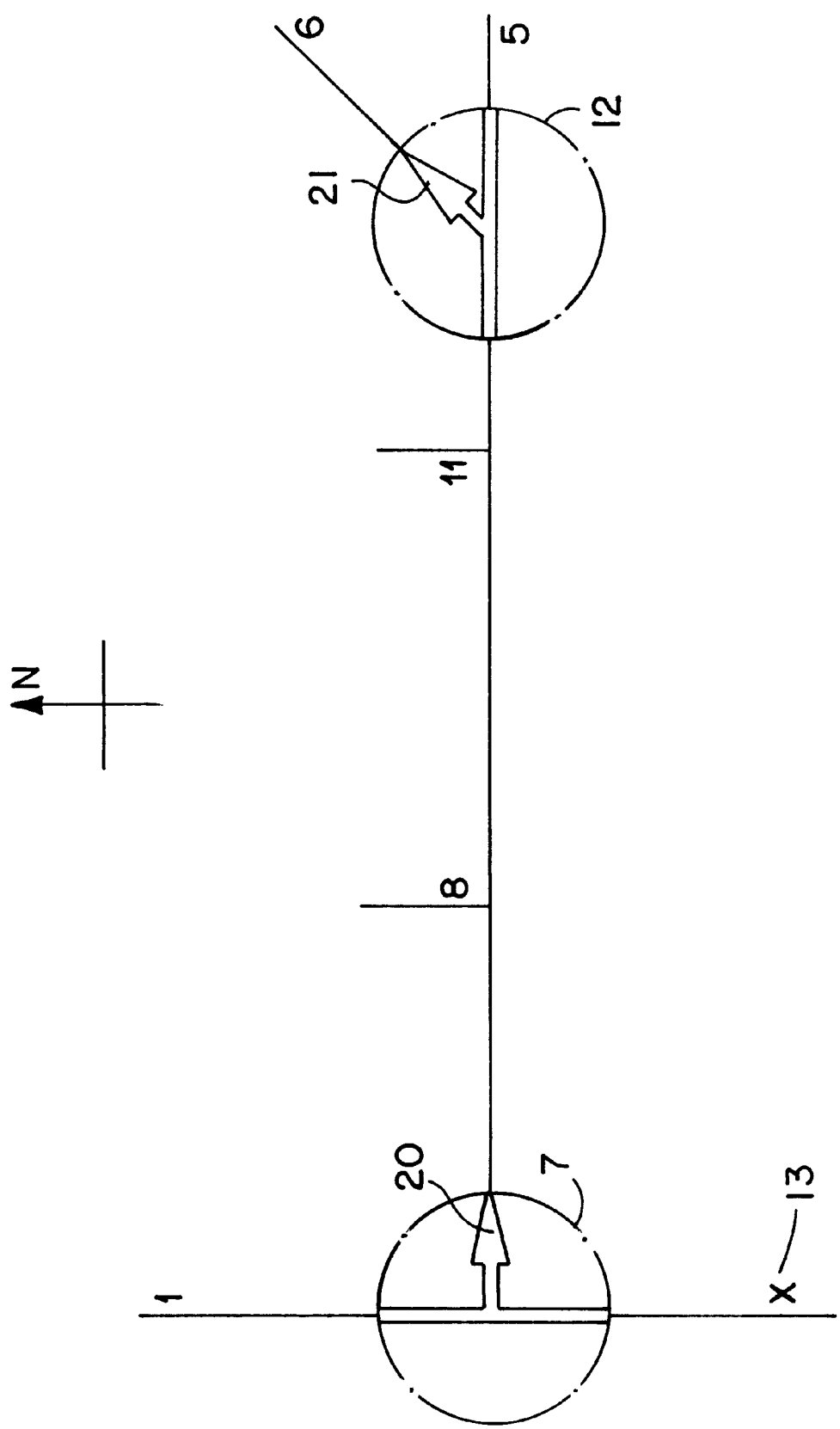
FIG. 2 shows an abstracted view of this section of the traffic network.

FIG. 2 shows in abstracted form a view of the section of the suggested route. An abstracted view such as this can be used, for example, in the central traffic station 14 and/or for optical information for the driver of a vehicle with a terminal unit. However, acoustic information for the driver of the vehicle 13 is also possible in addition or alternatively.

FIG. 2 shows schematically path points 7, 12 at which the vehicle must turn off from a road 1; 5 in accordance with the suggested route and turn possibilities 8, 11, where no left-hand turn is to be made, between the two path points 7, 12.

The view of path point 7 indicates by a symbol, in this case a circle, that the vehicle must turn off from a road 1. The roads at the path point 7 are shown in such a way that the compass direction indicates their respective paths. Further, in particular, it is possible in principle to show the current driving direction in a vehicle extending from bottom to top.

The vehicle arriving from below at path point 7 on Kölner Strasse 1 should not proceed on Kölner Strasse 1, but should turn right, or east, (at 7) onto Beethoven-Strasse 5 in the direction of arrow 20 at 7. It is given in a corresponding manner for turn possibility 12 that the vehicle should turn from Beethoven-Strasse 5 in the direction of arrow 21 onto Bachstrasse 6. Turn possibilities 8 to 11 (not circled) show in this case that no turn should be made from the road 5 in question.

Transmitted information can take the following forms, for example: The information which is given to the vehicle 13 at the approximate position in the traffic network shown in FIG. 1 can be, e.g., "turn right", "turn right after 3 km" (for example, when the vehicle reports its position to the central traffic station 14 as determined by GPS via mobile radio, so that the central traffic station 14 can report the distance 3 km by subtracting the position from path point 7), "next right turn onto Beethoven-Strasse", "next possible right, east onto Beethoven-Strasse." In so doing, information about the section of road to the next path point 12 after path point 7 is transmitted for information concerning path point 7. The transmission 15 of information from the central traffic station 14 to the terminal unit in the vehicle 13 can be carried out, for example, in such a way that codes which are predetermined in the central traffic station 14 and in the vehicle 13 for defined information are used. For example, a 1 can be allocated to right-hand turns and a 2 can be allocated to left-hand turns; west can be 3, east can be 4, etc. The number of left-hand and/or right-hand turn possibilities between two path points can be transmitted as a number according to a determined code.

The display for the driver of the vehicle 13 can be carried out in the vehicle 13 graphically, for example, as is shown in FIG. 2. Alternatively or in addition, the information can be conveyed acoustically.

What is claimed is:

1. A process for transmitting route information completely defining a route of a vehicle in a public traffic network, which route is suggested as a navigation aid, from a central traffic station to a terminal unit in the vehicle, wherein the route information concerns path points located on the suggested route, the process comprising:

defining a first path point wherever instructed by the central traffic station that the vehicle turn off from a road on which the vehicle is located; and transmitting additional information defining a next path point following in a driving direction of the suggested route in addition to route information at a path point to the terminal unit, the additional information defining the next path point after the first path point by indicating turn possibilities between the two path points, the transmitting step including a turning direction required for the route at a path point.

2. A process according to claim 1, wherein the additional information defines a length of road between the first path point and the next path point.

3. A process according to claim 1, wherein a number of left-turn possibilities is indicated.

4. A process according to claim 1, wherein a number of right-turn possibilities is indicated.

5. A process according to claim 1, including transmitting a name of the road to be taken to the terminal unit.

6. A process according to claim 1, wherein the defining step includes defining a path point wherever a road with a determined name is exited in a digital map of the traffic network in the central station.

7. A process according to claim 1, including transmitting the information from the central traffic station to the terminal unit in the vehicle in a wireless manner.

* * * * *